United States Patent Office 2,715,113
Patented Aug. 9, 1955

2,715,113

REACTION OF VINYL SILANES WITH CERTAIN PERHALOALKANES, THE PRODUCTS, AND THEIR HYDROLYSIS PRODUCTS

Arthur F. Gordon, Midland, Mich., assignor to Dow Corning Corporation, Midland, Mich., a corporation of Michigan No Drawing. Application January 11, 1954, Serial No. 403,429

13 Claims. (Cl. 260—46.5)

This invention relates to organosilanes having polyhalogenated aliphatic hydrocarbon radicals attached to the silicon, to a method of preparing such compounds, and to the siloxanes derived therefrom.

Past methods for preparing halogenated aliphatic substituted silanes have been carried out by one of two methods. One of these is the direct halogenation of aliphatic silanes such as methyl, ethyl, or butyl silanes. This method suffers from the disadvantage of producing a complex mixture of products, many of which are highly unstable to hydrolysis. For example, the chlorination of methyltrichlorosilane produces considerable quantities of dichloromethyltrichlorosilane and trichloromethyltrichlorosilane. Upon hydrolysis of these materials the chlorinated methyl groups are cleaved. Direct hydrolysis of higher alkyl chlorosilanes such as ethyl or propyl chlorosilanes produces materials in which some of the halogen atoms are located on carbon atoms beta to the silicon. These materials are also hydrolytically unstable.

Another method by which polyhalogenated aliphatic silanes have been prepared in the past is that of reacting an unsaturated polyhalogenated hydrocarbon such as tetrafluoroethylene with an alkenylsilane such as vinyl or allyl silanes. This method involves an olefin addition and is limited to the addition of halogenated compounds having at least two carbon atoms. Thus, it is not possible to add a halogenated methane by this method.

The present method provides an economical and a more versatile procedure for preparing polyhalogenated aliphatic silanes in good yields without producing hydrolytically unstable products.

The primary object of this invention is to provide a novel economical method for the preparation of polyhalogenated organosilanes and siloxanes which are useful as lubricants. Another object is to provide noninflammable siloxanes.

This invention relates to silanes of the formula $(X_{2m+1}C_mCH_2CHY)R_nSiZ_{3-n}$ where X is a halogen atom having an atomic weight less than 100, m is an integer from 1 to 2 inclusive, Y is a bromine or iodine, R is a monovalent hydrocarbon radical free of aliphatic unsaturation, n has a value from 0 to 2 inclusive, and Z is a halogen atom.

The above compounds are prepared in accordance with this invention by reacting a vinyl silane of the formula $(CH_2=CH)R_nSiZ_{3-n}$ in which R, n, and Z are as above defined, with a polyhalogenated compound of the formula $X_{2m+1}C_mY$ in which X, m, and Y are as above defined, at a temperature of at least 50° C. in the presence of a free radical generator.

When the above conditions are adhered to the polyhalogenated compound adds to the vinyl group of the silane in accordance with the following schematic equation:

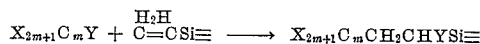

This reaction proceeds at a reasonable rate at temperatures from 50° C. up. Extremely high temperatures should be avoided, however, in order to prevent thermal decomposition of the products. In general, the preferred temperature range is from 100 to 200° C. The reaction can be carried out at any pressure ranging from subatmospheric to superatmospheric.

Any free radical generator can be employed in the reaction of this invention. Specific examples of free radical generators which are operative herein are heat, electromagnetic radiation such as gamma rays and ultraviolet light, organic peroxides such as benzoyl peroxide, t-butylperbenzoate and diacetyl peroxide, azo compounds such as decamethylenebismethylhydrazodicarboxylate, and triphenylmethane derivatives such as triphenylmethane and triphenylmethylazobenzene. In those cases where the polyhalogenated hydrocarbon is easily dissociated into free radicals, heat alone is sufficient to initiate the reaction. In general, however, more potent free radical generators such as ultraviolet light or organic generators are required.

The vinyl silanes included within the scope of this invention are those containing 1 vinyl group attached to the silicon and up to two monovalent hydrocarbon radicals free of aliphatic unsaturation. For the purposes of this invention the R group can be any monovalent hydrocarbon radical free of aliphatic unsaturation such as alkyl radicals such as methyl, ethyl, and octadecyl; aryl hydrocarbon radicals such as phenyl, xenyl, tolyl, and benzyl and cycloaliphatic radicals such as cyclohexyl and cyclopentyl. Thus, specific examples of vinyl silanes which are operative herein are vinyltrichlorosilane, vinyltrifluorosilane, vinylphenyldibromosilane, vinyloctadecyldichlorosilane, vinyldiphenyliodosilane, vinylcyclohexldifluorosilane, vinyltolylmethylchlorosilane, and benzylvinyldichlorosilane.

The polyhalogenated hydrocarbons which are employed in the reaction of this invention include any polyfluorinated, polychlorinated, or polybrominated ethane and methane which contains at least 1 bromine or 1 iodine atom in the molecule. Specific examples of the perhalogenated compounds which are operative herein are:

| | |
|---|---|
| $CF_3I$ | $CF_2ClCFlI$ |
| $CCl_2I$ | $C_2Br_6$ |
| $CBr_3I$ | $CCl_3CCl_2Br$ |
| $CBr_4$ | $CBr_3CBr_2I$, and |
| $CFCl_2Br$ | $CCl_3CCl_2I$ |

For the purpose of this invention the halogen atoms attached to the silicon, that is, the Z atoms, can be any halogen atom although preferably the halogen is bromine, chlorine, or fluorine or combinations thereof.

An alternative method for preparing some of the silanes of this invention, particularly those in which all of the X atoms are fluorine, is that of carrying out a halogen interchange between the compounds in which the X radicals are chlorine or bromine and antimony trifluoride. For example,

is converted to

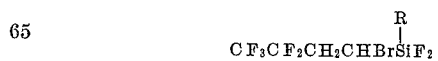

by this method which is more fully described in the applicant's copending application Serial No. 403,430, filed simultaneously herewith, now abandoned, and in his application Serial No. 432,030, filed May 24, 1954. Briefly, it comprises heating a mixture of the chloro or bromo silane with antimony trifluoride at a temperature of at least 50° C. Oftentimes, it is desirable to employ antimony pentachloride as a catalyst.

The silanes of this invention can be hydrolyzed in the normal manner for hydrolyzing halosilanes to give siloxanes of the formula $$(X_{2m+1}C_mCH_2CHY)R_nSiO_{\frac{3-n}{2}}$$

in which X, $m$, Y, R, and $n$ are as above defined. These siloxanes can be made in the form of fluids, elastomers, and resins by varying the ratio of the organic groups to silicon atom by methods well known in the art.

The siloxanes of this invention may be homopolymers in which all of the siloxane units are alike or they may be copolymeric materials containing two or more different siloxane units each containing a polyhalogenated radical attached to the silicon. These copolymers are best prepared by cohydrolyzing two or more different halogenated aliphatic silanes.

In addition the siloxanes of this invention can be copolymerized with hydrocarbon substituted siloxanes of the formula $$R'_aSiO_{\frac{4-a}{2}}$$

in which R' is any monovalent hydrocarbon radical and $a$ has an average value from 1 to 3 inclusive. These copolymers may be prepared by cohydrolysis of the corresponding hydrolyzable silanes or by catalytic copolymerization of the corresponding siloxanes. Specific examples of hydrocarbon substituted siloxanes which can be copolymerized with those of this invention are dimethylsiloxane, diphenylsiloxane, phenylmethylsiloxane, trimethylsiloxane, phenyldimethylsiloxane, monophenylsiloxane, monomethylsiloxane, octadecylmethylsiloxane, and monoxenylsiloxane. The polyhalogenated siloxanes of this invention may compose from .001 to 99.999 mol per cent of these copolymers.

The siloxanes of this invention, both homopolymers and copolymers, are useful as lubricants, coating resins, and for the preparation of siloxane elastomers. They are characterized by being noninflammable, that is, they are self-extinguishing. The silanes of this invention are useful for water-repelling materials and as intermediates in the preparation of other organosilicon compounds.

The following examples are illustrative only and should not be construed as limiting the invention which is properly delineated in the appended claims.

*Example 1*

81 g. of vinyltrichlorosilane, 198.5 g. of trichlorobromomethane, and 10 g. of benzoyl peroxide were mixed and heated slowly to 136.5° C. over a period of 20 hours. Upon distilling the products a 70% yield of $$CCl_3CH_2CHBrSiCl_3$$

was obtained. This material had the following properties: B. P. 138.5° C. at 30 mm., sp. gr. 25° C. 1.810, and $n_D^{25°}$ 1.5223.

When this chlorosilane is hydrolyzed by dissolving it in ether and then adding the solution to water, the resinous siloxane having the unit formula $CCl_3CH_2CHBrSiO_{1.5}$ is obtained.

*Example 2*

1847.5 g. of vinylmethyldichlorosilane and 3250 g. of trichlorobromomethane were mixed and heated up to 160° C. for 53 hours while being radiated internally with ultraviolet light from a germicidal 8-watt lamp. Upon distillation of the product an 82% yield of $$CCl_3CH_2CHBrSi(Me)Cl_2$$

was obtained. This material had the following properties: B. P. 115° C. at 10 mm., sp. gr. 25° C. 1.688, and $n_D^{25°}$ 1.5175.

*Example 3*

The chlorosilane of Example 2 was hydrolyzed by diluting it with diethylether and then adding water to the solution. The resulting hydrolyzate was washed neutral and after evaporation of the solvent, the polysiloxane having the unit formula $CCl_3CH_2CHBrSi(Me)O$ was obtained. This fluid had a sp. gr. at 25° C. of 1.690 and $n_D^{25}$ of 1.5254.

*Example 4*

83.3 g. of $CCl_3CH_2CHBrSi(Me)Cl_2$, 31.7 g. of dimethyldichlorosilane, 5.9 g. of trimethylchlorsilane, and 186.8 g. of toluene were mixed and added to 151.2 g. of water over a period of 1 hour at 20–35° C. The resulting product was washed free of acid and stripped of low boiling materials by heating up to 145° C. at a pressure of 1 mm. The resulting fluid was a noninflammable stable lubricant. This material was a copolymer containing $CCl_3CH_2CHBrSi(Me)O$, $Me_2SiO$, and $Me_3SiO_{.5}$ units.

*Example 5*

A mixture of 580.5 g. of dimethyldichlorosilane and 169.8 g. of $CCl_3CH_2CHBrSi(Me)Cl_2$ was hydrolyzed by adding thereto 135 g. of water over a period of 1½ hours. The resulting copolymeric siloxane was polymerized with hydrochloric acid to give a high molecular weight polysiloxane. This was washed free of acid and 100 parts by weight of the polymer were milled with 40 parts by weight of a fume silica and 2 parts by weight of t-butylperbenzoate. The resulting mixture was vulcanized by heating in a mold 15 minutes at 150° C. The resulting product was an elastomeric material.

*Example 6*

498 g. of carbontetrabromide and 253.8 g. of vinylmethyldichlorosilane were mixed and heated to 191° C. while being radiated internally with an 8-watt germicidal ultraviolet lamp. The heating and radiation were carried out for 10 hours and 45 minutes. Upon distillation of the product the compound $CBr_3CH_2CHBrSi(Me)Cl_2$, B. P. 116.5° C. at 1 mm. and having a sp. gr. at 25° C. of 2.277 and an $n_D^{35}$ of 1.5796, was obtained. The molar refraction was found to be 69.1.

When this chlorosilane is hydrolyzed in ether solution with water as shown in Example 3 and the resulting hydrolysis product washed free of acid and stripped to remove the solvent, a fluid polysiloxane having the unit formula $$CBr_3CH_2CHBrSiO \atop Me$$

is obtained.

*Example 7*

183.5 g. of $CF_2ClCFClI$ and 116 g. of vinylmethyldichlorosilane were mixed and heated to 124° C. over a period of 136 hours during which time the reaction mixture was externally radiated with an 8-watt germicidal ultraviolet lamp. Upon distillation of the product the compound $CF_2ClCFClCH_2CHISi(Me)Cl_2$, B. P. 116.5° C. at 33 mm. and having a sp. gr. at 25° C. of 1.846 and an $n_D^{25}$ of 1.4895, was obtained. This material had a molar refraction of 65.1.

When this chlorosilane is hydrolyzed in accordance with the method of Example 3, a fluid siloxane having the unit formula $$CF_2ClCFClCH_2CHISiO \atop Me$$

is obtained.

*Example 8*

1400 g. of the compound $CCl_3CH_2CHBrSi(Me)Cl_2$ was added over a period of 1 hour and 40 minutes to a mixture of 1450 g. of $SbF_3$ and 225 g. of $SbCl_5$. The reaction was exothermic reaching a temperature of 120° C. by the end of the addition. Upon distillation the compound $CF_3CH_2CHBrSi(Me)F_2$, B. P. 114 to 115° C.

at 736 mm. and having a sp. gr. at 25° C. of 1.579 and an $n_D^{25}$ of 1.3680, was obtained together with the compound $CF_2ClCH_2CHBrSi(Me)F_2$, B. P. 67.5 to 67.8° C. at 50 mm. and having a sp. gr. at 25° C. of 1.631 and an $n_D^{25}$ of 1.4000.

*Example 9*

134.9 g. of $CF_3CH_2CHBrSi(Me)F_2$ was mixed with an equal volume of diethylether and added dropwise with stirring over a period of 45 minutes to a solution of 126 g. of sodium bicarbonate in 234 g. of water. After refluxing for 1 hour, 50 g. of $H_2SO_4$ was gradually added over a period of 50 minutes. The hydrolysis mixture was then diluted with 50 ml. of toluene and the mixture was heated with stirring 1 hour and 45 minutes at 60 to 70° C. The organic layer was washed neutral and after removal of the solvent the resulting polymeric siloxane was distilled to give the product having a boiling range 142 to 170° C. at 2 mm. This material was a mixture of cyclic siloxanes having the unit formula $$CF_3CH_2CHBrSi(Me)O$$

*Example 10*

When pentachlorobromoethane is reacted with vinylphenyldibromosilane in accordance with the method of Example 1, the compound $$CCl_3CCl_2CH_2CHBrSi(C_6H_5)Br_2$$

is obtained.

When this bromosilane is hydrolyzed in accordance with the method of Example 3, a fluid siloxane having the unit formula $CCl_3CCl_2CH_2CHBrSi(C_6H_5)O$ is obtained.

*Example 11*

When pentabromoiodoethane is reacted with vinyldibutylchlorosilane in accordance with the method of Example 1 the compound $CBr_3CBr_2CH_2CHISi(Bu)_2Cl$ is obtained.

When this chlorosilane is hydrolyzed in accordance with the method of Example 3, the disiloxane $$[Cbr_3CBr_2CH_2CHISi(Bu)_2]_2O$$

is obtained.

That which is claimed is:

1. The method which comprises reacting a compound of the formula $(CH_2=CH)R_nSiZ_{3-n}$ with a compound of the formula $X_{2m+1}C_mY$ in which compounds R is a monovalent hydrocarbon radical free of aliphatic unsaturation, $n$ has a value from 0 to 2 inclusive, Z is a halogen atom, X is a halogen atom having an atomic weight less than 100, $m$ is an integer from 1 to 2 inclusive, and Y is selected from the group consisting of bromine and iodine atoms, by heating said compounds at a temperature of at least 50° C. in the presence of a free radical generator.

2. A compound of the formula $$(X_{2m+1}C_mCH_2CHY)R_nSiZ_{3-n}$$

in which X is a halogen atom having an atomic weight less than 100, $m$ is an integer from 1 to 2 inclusive, Y is selected from the group consisting of bromine and iodine atoms, R is a monovalent hydrocarbon radical free of aliphatic unsaturation, $n$ has a value from 0 to 2 inclusive, and Z is a halogen atom.

3. $CCl_3CH_2CHBrSiCl_3$.
4. $CCl_3CH_2CHBrSi(Me)Cl_2$.
5. $CBr_3CH_2CHBrSi(Me)Cl_2$.
6. $CF_3CH_2CHBrSi(Me)F_2$.

7. The method which comprises hydrolyzing a silane of the formula $(X_{2m+1}C_mCH_2CHY)R_nSiZ_{3-n}$ with water whereby a siloxane of the formula $$(X_{2m+1}C_mCH_2CHY)R_nSiO_{\frac{3-n}{2}}$$

is obtained, in said compounds X is a halogen atom having an atomic weight less than 100, $m$ is an integer from 1 to 2 inclusive, Y is selected from the group consisting of bromine and iodine atoms, R is a monovalent hydrocarbon radical free of aliphatic unsaturation, $n$ has a value from 0 to 2 inclusive, and Z is a halogen atom.

8. A siloxane having the unit formula $$(X_{2m+1}C_mCH_2CHY)R_nSiO_{\frac{3-n}{2}}$$

in which X is a halogen atom having an atomic weight less than 100, $m$ is an integer from 1 to 2 inclusive, Y is selected from the group consisting of bromine and iodine atoms, R is a monovalent hydrocarbon radical free of aliphatic unsaturation, and $n$ has a value from 0 to 2 inclusive.

9. A siloxane having the unit formula $$CCl_3CH_2CHBrSiO_{1.5}$$

10. A siloxane having the unit formula $$CCl_3CH_2CHBrSi(Me)O$$

11. A siloxane having the unit formula $$CBr_3CH_2CHBrSi(Me)O$$

12. A siloxane having the unit formula $$CF_3CH_2CHBrSi(Me)O$$

13. A copolymeric siloxane composed of siloxane units of the formula $$(X_{2m+1}C_mCH_2CHY)R_nSiO_{\frac{3-n}{2}}$$

in which X is a halogen atom having an atomic weight less than 100, $m$ is an integer from 1 to 2 inclusive, Y is selected from the group consisting of bromine and iodine atoms, R is a monovalent hydrocarbon radical free of aliphatic unsaturation, and $n$ has a value from 0 to 2 inclusive and siloxane units of the formula $$R'_aSiO_{\frac{4-a}{2}}$$

in which R' is a monovalent hydrocarbon radical and $a$ has an average value from 1 to 3 inclusive.

References Cited in the file of this patent

UNITED STATES PATENTS

| | | |
|---|---|---|
| 2,420,912 | Hurd | May 20, 1947 |
| 2,468,208 | Kharasch | Apr. 26, 1949 |